(12) United States Patent
Greenthal

(10) Patent No.: US 8,690,633 B2
(45) Date of Patent: Apr. 8, 2014

(54) SANITARY BEEHIVE HONEYCOMB SUSPENDING FRAME

(75) Inventor: Steven M. Greenthal, Buena Park, CA (US)

(73) Assignee: Nitroworks Corporation, Buena Park, CA (US)

( * ) Notice: Subject to any disclaimer, the term of this patent is extended or adjusted under 35 U.S.C. 154(b) by 368 days.

(21) Appl. No.: 13/066,834

(22) Filed: Apr. 26, 2011

(65) Prior Publication Data

US 2012/0052768 A1 Mar. 1, 2012

Related U.S. Application Data

(63) Continuation-in-part of application No. 29/370,713, filed on Aug. 25, 2010, now Pat. No. Des. 637,358.

(51) Int. Cl.
*A01K 47/02* (2006.01)
(52) U.S. Cl.
USPC ........................................................... 449/43
(58) Field of Classification Search
USPC .......................................... 449/42, 43, 44, 45
See application file for complete search history.

(56) References Cited

U.S. PATENT DOCUMENTS

| | | | | |
|---|---|---|---|---|
| 3,231,907 A | * | 2/1966 | Covington | 449/43 |
| 4,374,440 A | * | 2/1983 | Drapkin | 449/43 |
| 4,403,358 A | * | 9/1983 | Burgin et al. | 449/43 |

FOREIGN PATENT DOCUMENTS

DE          31 09 003 A1 *  9/1982  ...................... 449/44

* cited by examiner

*Primary Examiner* — Rob Swiatek
(74) *Attorney, Agent, or Firm* — Erickson, Kernell, Derusseau & Kleypas, LLC

(57) ABSTRACT

A polymeric frame enclosing a rectangular aperture sized to receive in conforming fit a rectangular foundation panel on which a bee honeycomb is formed. The frame is formed by injection molding as an integral unitary piece with the interior volumes thereof foamed in the course of the molding process so that the exterior surfaces thereof remain smooth and impervious, allowing for easy cleaning and re-use. A plurality of alternatively sloped wedge projections are formed in spaced rows on each interior surface of the foundation panel receiving aperture between which the edges of the panel are captured by flexure relief.

11 Claims, 2 Drawing Sheets

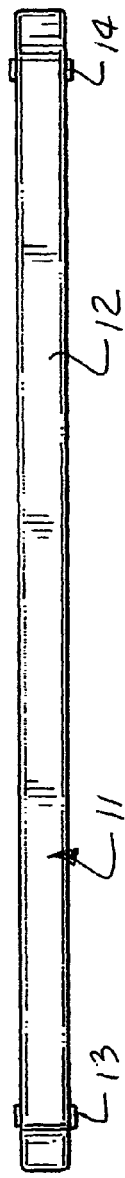
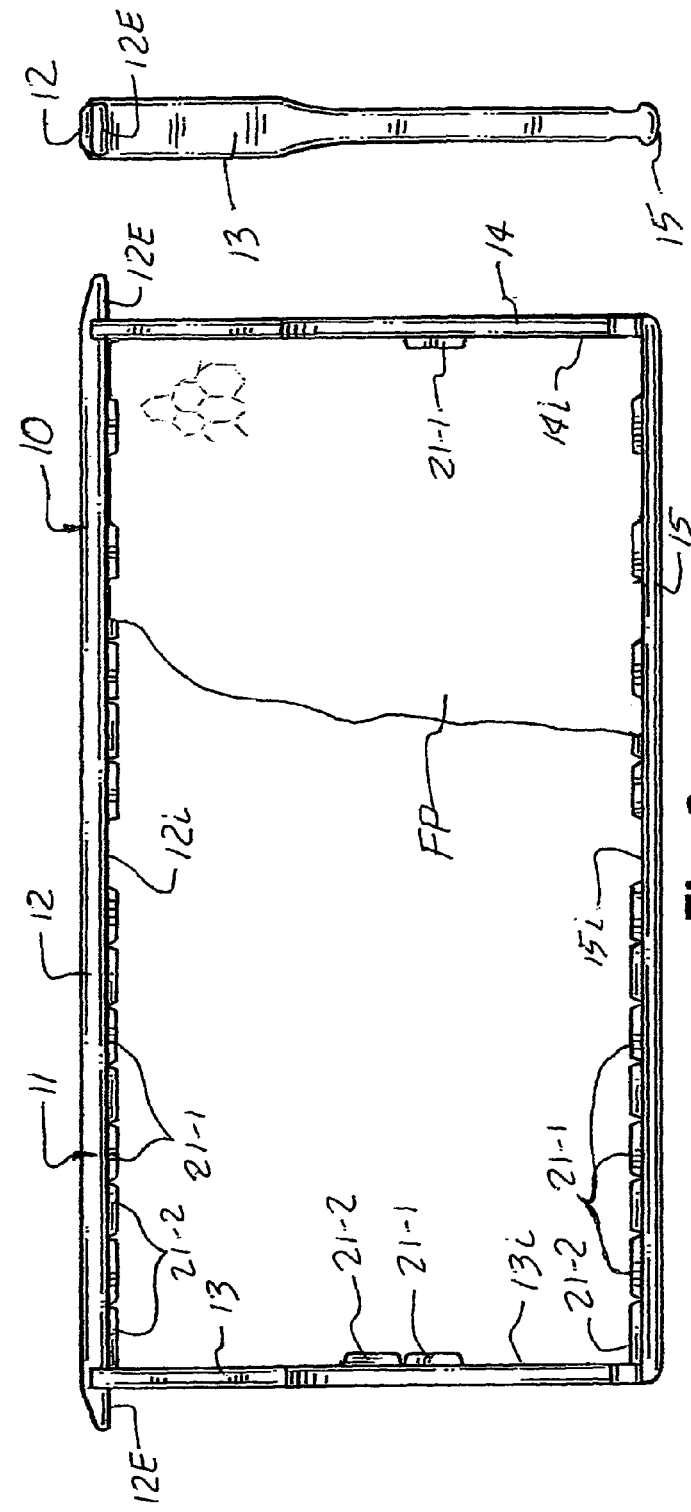
Fig. 1
Fig. 2
Fig. 3
Fig. 4

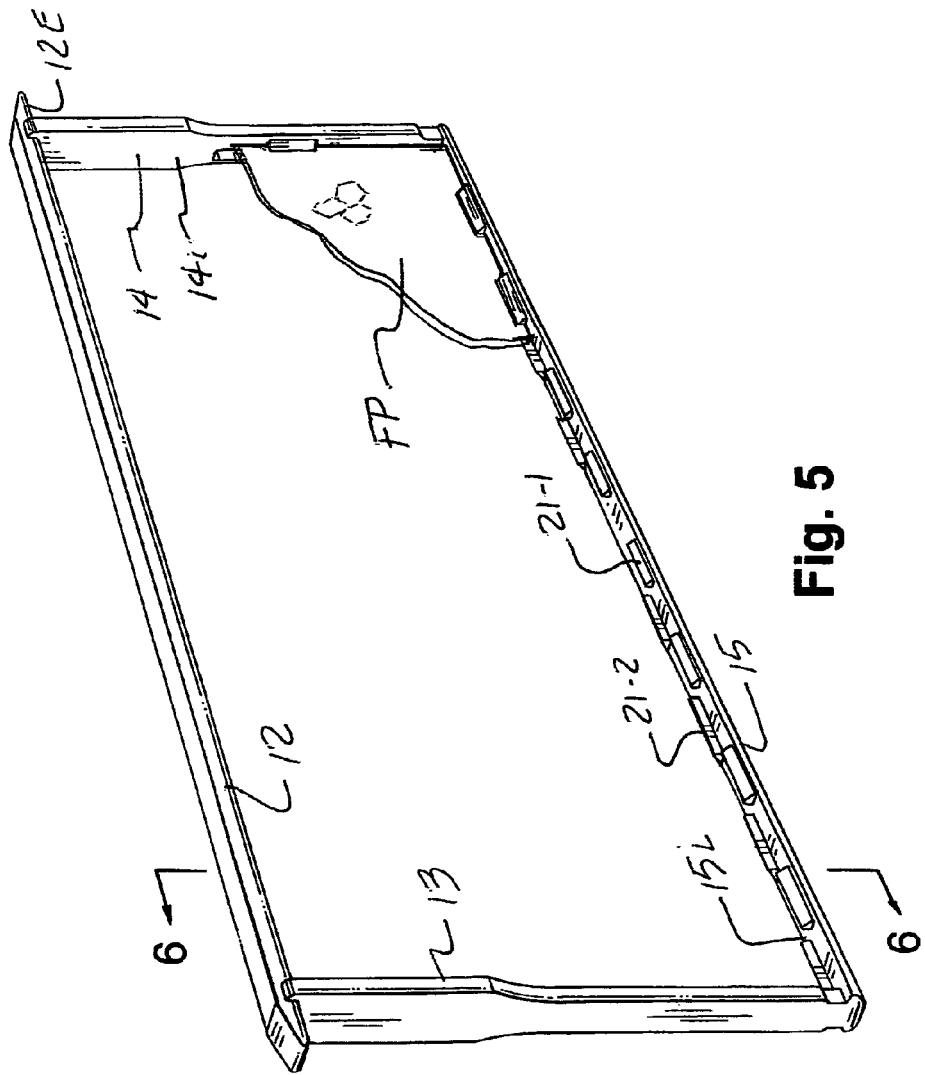
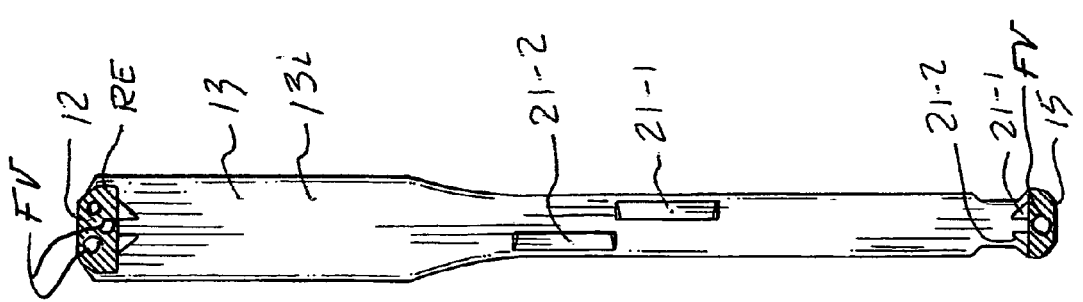
Fig. 5
Fig. 6

SANITARY BEEHIVE HONEYCOMB SUSPENDING FRAME

REFERENCE TO RELATED APPLICATIONS

This application is a continuation-in-part of U.S. design application Ser. No. 29/370,713 filed on Aug. 25, 2010, now U.S. Pat. No. D637,358 and the benefit of this earlier filing date is claimed for all matter common therewith.

BACKGROUND OF THE INVENTION

1. Field of the Invention

The present invention relates to beehive honeycomb frames, and more particularly to injection molded frame structures onto which honeycomb foundation plates can be selectively mounted and dismounted.

2. Description of the Prior Art

The current stresses and imbalances in the world's ecology find various expressions amongst which is a drastically falling bee population. The concerns over this mechanism associated with much of our plant fertility are now widely shared and all sorts of inspections and studies are being focused on finding the exact cause of this critical depopulation of the bees. While the specific question is as yet not fully answered, the general consensus, both now and in the past, has been centered around biological pathogens as the infective agent that most likely is causing these massive bee losses.

The nature of the evolved cooperative patterns is such that once one member of the hive is exposed to the infectious agent the disease, parasite or resulting toxin is quickly spread within the close quarters of the hive, resulting in catastrophic consequences. One suspected mechanism for this spread is the infection transfer on the honeycomb frame and the most current wisdom or convention addressing these health concerns has been a three to five year honeycomb frame replacement program, a large expense and burden associated with the maintenance of a healthy bee population, an expense that could be mitigated to a substantial extent by conservative measures of cleaning and re-use of these frames.

While the prior art is replete with various mechanisms directed at a singular parasite or infective pathogen, exemplified by the teachings of U.S. Pat. No. 7,767,234 to Probasco; U.S. Pat. No. 6,620,025 to Scheuneman et al.; and others; mechanisms for sterilizing the air flows through a bee hive as in US published patent application 2008/0064298 by Junqueira de Souza et al; U.S. Pat. No. 4,877,990 to Florenzano, Jr.; and others; and those applying various antimicrobial surface coatings in a bee hive like that exemplified in U.S. Pat. No. 6,096,350 to Kemp et al., each of these also entail the even larger cost and burden of a constant upkeep effort, like the maintenance of the antibacterial vapor or coating efficacy, and/or the operation of the flow generating machinery, and the like, without the much wider benefit of the above frame replacement program, and this inherently much wider benefit, therefore, now sets the proper maintenance standard.

Since the main source of persistent re-infection in a bee hive appears to be the frames that support the honeycombs that are constantly visited by the working bees and since optimal worker bee patterns are achieved at close frame spacings, these narrowly spaced structures, that are often made from porous wood over which the worker bees laden with their foraging collections traverse, become repositories and a fertile ground for all sorts of pathogens like fungi, bacteria, beetles and mites. These porous wood structures, however, like all naturally grown items, are inherently prone to deterioration and cracking resulting from these same invasive mechanisms promoted by the porous nature thereof which is then only exacerbated by periodic cleaning. The currently proposed polymeric substitute injection molded frame assemblies, as exemplified by polymeric substitutes found in U.S. Pat. No. 4,403,358 to Burgin et al.; U.S. Pat. No. 4,216,557 to Golde; and others. While suitable for their intended purposes, each of these substitutes is formed by interlocking hollow plastic members that include various crevasses, voids and/or cracks (which the bees then try to seal by the bee-produced sealer propolis, thus setting an elegant example of how the problem can be resolved when monetary economics are not in the equation) are rendered difficult to clean because of these same cracks and crevasses which then repeat, after their cleanings, the same surface voids that promote infection.

Besides the infection risk an accumulation of all sorts of unwanted matter further exacerbates the structural weight (or mass inertia) and the aging of the frame members, compromising even more the structural integrity when a frame, precariously supporting a honey laden honeycomb on a honeycomb foundation retained only along two of its opposed edges, is periodically spun in a centrifuge to collect the honey. This added structural mass, compromised integrity and the limited support of the foundation edges present substantial difficulties during this spinning process, and while the foregoing polymeric frame substitutes have to some extent reduced the levels of infectious contaminants, their segmented structures and the various creases present nonetheless a persisting infection challenge and a re-use and cleaning process that remains cumbersome and costly.

An easily cleaned by established procedures that remove all offending matter, integral, light-weight, fully sealed and internally foamed frame structure that easily engages all the edges of the foundation panel in the course of re-assembly after cleaning is therefore extensively desired and it is one such structure that is disclosed herein.

SUMMARY OF THE INVENTION

Accordingly, it is the general purpose and object of the present invention to provide an externally smooth, and therefore easily cleaned, unitary bee hive honeycomb frame conformed to easily engage by flexure relief all the four edges of a rectangular honeycomb foundation.

Further objects of the invention are to provide a polymeric beehive honeycomb frame defined by an impervious exterior surface and a foamed interior that promotes easy periodic cleaning while minimizing pathogen accumulation in the course of use.

Yet additional and other objects shall become apparent upon the examination of the description that follows in conjunction with the illustrations appended thereto.

Briefly, these and other objects are accomplished within the present invention by providing a polymeric, unitary rectangular frame defined by an upper and lower horizontal frame member at the respective upper and lower ends of a pair of vertical members with the upper frame member extending at each end beyond the vertical members to form cantilevered projections on both sides for suspending the frame between a pair of hangers deployed in the beehive. A set of spaced, wedge sectioned projections arranged in alternating alignments along the longitudinal center lines of each of the surfaces defining the opening in the frame extend in staggered opposition to define a reduced aperture therebetween within which a flexible, generally planar honeycomb foundation panel is retained by interlacing its edges between the spaced projections by flexure relief. It is this foundation that then serves as a base on which the bees then form their honeycombs.

Preferably this unitary frame structure is be formed by known injection molding processes in which a polymeric material like styrene or polypropylene is first heated and then admixed with a chemical foaming agent or compressed gas thereafter. This combination is then injected into the mold and as the expanding molten mix fills the void of the mold cavity the contact with the colder mold surfaces results in a lower local foaming rate, transferring the gas expansion process towards the higher temperature inner regions which therefore result in an unfoamed, homogeneous and solid exterior skin while the hotter interior volume continues the foaming process by creating gas bubbles and accepting the transfer of those from the exterior cooler regions. Examples of such techniques utilizing chemical foaming agents can be obtained from commercial sources such as the technique vended under the mark or style 'FOAMAZOL'™ by Bergen International, LLC, 411 State Highway 17 South, Suite 100, Hasbrouck Heights, N.J. 07604.

In this manner a generally rectangular, unitary, lightweight frame structure is obtained which is smooth and impervious over the whole of its exterior surfaces that are then used to support the honeycomb foundation along all its four edges by interlaced engagement between rows of spaced in alternating wedge alignment projections on each of the four frame surfaces defining the interior aperture therein. In this manner all the four edges of the conforming rectangular polymeric foundation panel are engaged between these projections by interlaced capture, thus fully engaging the foundation, and the honeycomb formed thereon, throughout its use including the vigorous and robust periods when the assembly is spun in a centrifuge to extract the honey.

BRIEF DESCRIPTION OF THE DRAWINGS

FIG. 1 is a top view of the inventive honeycomb suspending frame conformed to receive a honeycomb foundation panel in accordance with the present invention;

FIG. 2 is a front view of the inventive honeycomb suspending frame in its typical useful deployment;

FIG. 3 is a bottom view of the inventive honeycomb suspending frame;

FIG. 4 is an first end view of the inventive honeycomb suspending frame;

FIG. 5 is a perspective view of the beehive honey comb suspending frame shown with a partial honeycomb foundation panel in its engaged deployment; and FIG. 6 is a sectional detail view of the inventive honeycomb suspending frame taken along line 6-6 of FIG. 5.

DESCRIPTION OF THE PREFERRED EMBODIMENT

As shown in FIGS. 1 through 6, the inventive honeycomb suspending frame, generally designated by the numeral 10, is formed as a rectangular structure 11 comprising an elongate upper frame piece 12 spanning across the upper ends of a pair of vertical frame pieces 13 and 14 to extend in cantilevered projection its free ends 12E beyond of the vertical pieces 13 and 14 to engage as hangers spaced supports within the beehive (not shown). The vertical pieces 13 and 14 each extend as a part of a unitary injection molded structure in an orthogonal alignment from frame piece 12 to join at their free ends the corresponding ends of a transverse lower frame piece 15, thereby defining a rectangular aperture in the interior of structure 11 dimensionally conformed to receive a substantially flat polymeric foundation panel FP fitted within the surfaces 12$i$, 13$i$, 14$i$ and 15$i$ on the interior face of each of the corresponding pieces.

This conformingly sized, commercially available foundation panel FP is captured within the rectangular aperture thus defined by the interior surfaces by interlaced engagement between two rows of spaced, wedge shaped projections 21-1 and 21-2 arranged in an alternating alignment on either side of a longitudinal center line of each of the interior surfaces 12$i$ through 15$i$. Of course, since the opposing wedge heights cumulatively reduce the effective aperture dimensions to a planform smaller than the dimensions of the foundation panel FP its installation process therefore requires that the panel be flexed to accommodate this dimensional deficit with the flexure then relieved when alignment between the alternating projections is obtained, thereby effecting a robust edge engagement that then holds the panel in place throughout the course of its use which includes periodic spinning in a centrifuge to extract the honey.

Those in the art will appreciate that the foregoing alternating wedge arrangement about the centerline of each of the frame portions is particularly suited for a parting surface implementation in an injection mold, thus simplifying the cost and complexity of the fabrication process. To further conserve on material costs the above-referenced foaming techniques may be utilized which, by the simple expedient of the mold thermal mass, effectively localize the foaming voids (or bubbles) FV deep within the interior of the frame portions while the regions RE closer to the surface are effectively void-free.

In this manner the separation lines on the resulting article are mostly localized subjacent the edges of the panel FP and are thus obscured from the normal movement of the worker bees, with most of the travel confined to the smooth skin surfaces of the frame. As a result an easily cleaned, smooth and conveniently disassembled for cleaning, frame structure is obtained that is easy reassembled for reuse after cleaning to produce a robustly interlocked assembly in its functional combination that also reduces the incidence of cross-infection.

Obviously many modifications and variations of the instant invention can be effected without departing from the spirit of the teachings herein. It is therefore intended that the scope of the invention be determined solely by the claims appended hereto.

I claim:

1. A polymeric frame useful to support a honeycomb foundation panel, comprising:
   a frame structure defined by an elongate upper member extending across the upper ends of a pair of elongate side members having the lower ends thereof each respectively joined to the ends of an elongate lower member, said upper, side and lower members defining an interior aperture conformed to receive said foundation panel; and
   a plurality of oppositely sloped, wedge shaped projections formed in alternating spaced rows along the periphery of said aperture on an interior surface of at least said upper and lower members or said side members; said oppositely sloped, wedge shaped projections spaced apart a distance sufficient to receive a honeycomb foundation panel therebetween.

2. A polymeric frame according to claim 1, wherein:
   said frame structure is formed by injection molding as an integral unitary article.

3. A polymeric frame according to claim 2, wherein:
said frame structure is foamed in the course of the injection molding thereof.

4. A polymeric frame according to claim 1, wherein:
said elongate upper member includes end projections extending beyond each said elongate side member.

5. A polymeric frame according to claim 4, wherein:
said frame structure is formed by injection molding as an integral unitary article.

6. A polymeric frame according to claim 5, wherein:
said frame structure is foamed in the course of the injection molding thereof.

7. A polymeric frame according to claim 1, wherein:
the exterior surfaces of said frame structure are formed as impervious surfaces.

8. A polymeric frame useful to support a honeycomb foundation panel, comprising:
a frame structure formed by injection molding as an integral unitary article and defined by an elongate upper member extending across the upper ends of a pair of elongate side members having the lower ends thereof each respectively joined to the ends of an elongate lower member, said upper, side and lower members defining an interior aperture conformed to receive said foundation panel; and
a plurality of oppositely sloped, wedge shaped projections formed in alternating spaced rows along the periphery of said aperture on an interior surface of at least said upper and lower members or said side members; said oppositely sloped, wedge shaped projections spaced apart a distance sufficient to receive a honeycomb foundation panel therebetween.

9. A polymeric frame according to claim 8, wherein:
the interior portions of said frame structure members are foamed in the course of the injection molding thereof.

10. A polymeric frame according to claim 9, wherein:
said elongate upper member includes end projections extending beyond each said elongate side member.

11. A polymeric frame according to claim 8, wherein:
the exterior surfaces of said frame structure are formed as impervious surfaces.

* * * * *